(12) United States Patent
Shi et al.

(10) Patent No.: US 8,194,614 B2
(45) Date of Patent: Jun. 5, 2012

(54) METHODS AND SYSTEMS FOR MOB_HO-IND MESSAGE ENHANCEMENT

(75) Inventors: Guangming Carl Shi, San Diego, CA (US); Tom Chin, San Diego, CA (US); Yu Wang, San Diego, CA (US); Wei Zhang, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 12/706,347

(22) Filed: Feb. 16, 2010

(65) Prior Publication Data

US 2010/0232328 A1 Sep. 16, 2010

Related U.S. Application Data

(60) Provisional application No. 61/160,274, filed on Mar. 13, 2009.

(51) Int. Cl.
*H04B 7/216* (2006.01)
*H04L 12/56* (2006.01)

(52) U.S. Cl. ......... 370/331; 370/252; 370/278; 370/311

(58) Field of Classification Search .............. 370/278, 370/331, 252, 311
See application file for complete search history.

(56) References Cited

U.S. PATENT DOCUMENTS 8,112,088 B2 * 2/2012 Lee et al. ............... 455/436

FOREIGN PATENT DOCUMENTS

EP 1954078 8/2008

OTHER PUBLICATIONS

IEEE Computer Society and the IEEE Microwave Theory and Techniques Society: "IEEE Standard for Local and metropolitan area networks—Part 16: Air Interface for Fixed and Mobile Broadband Wireless Access Systems; Amendment 2: Physical and Medium Access Control Layers for Combined Fixed and Mobile Operation in Licensed Bands and Corrigendum 1," IEEE Std 802.16e-2005 and IEEE Std 802.16/2004/Cor1-2005, (Feb. 28, 2006), XP017601713.
International Search Report and Written Opinion—PCT/US2010/027067, International Search Authority—European Patent Office—Jul. 8, 2010.
Park, Jaesung et al: "Handover-Specific Optimization for IEEE 802.16e Sleep Mode," Advances in Multimedia Modeling Lecture Notes in Computer Science, 2006, vol. 4352/2006, pp. 560-567, XP019054901, (Jan. 9, 2007).

* cited by examiner

*Primary Examiner* — John Pezzlo
(74) *Attorney, Agent, or Firm* — Charles Chesney

(57) ABSTRACT

Certain embodiments of the present disclosure provide a method and apparatus for efficient reactivation of a previously exited sleep mode. The proposed method may send a request for reactivation of the sleep mode along with the handover cancellation message to the serving base station. For certain embodiments, the request may include a set of sleep mode parameters used in the previously exited sleep mode.

48 Claims, 9 Drawing Sheets

METHODS AND SYSTEMS FOR MOB_HO-IND MESSAGE ENHANCEMENT

CLAIM OF PRIORITY

This application claims the benefit of priority from U.S. Provisional Patent Application Ser. No. 61/160,274, entitled "Enhancement of MOB_-HO-IND Messages for Sleep Mode Reactivation in WiMAX Handover" and filed Mar. 13, 2009, and assigned to the assignee hereof and hereby expressly incorporated by reference herein.

TECHNICAL FIELD

Certain embodiments of the present disclosure generally relate to wireless communication, and more particularly to reactivation of sleep mode.

BACKGROUND

Orthogonal frequency-division multiplexing (OFDM) and orthogonal frequency division multiple access (OFDMA) wireless communication systems, such as those compliant with the Institute of Electrical and Electronics Engineers (IEEE) 802.16 family of standards, typically use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. The WiMAX standards define a sleep mode during which a mobile station (MS) may power down components in an effort to conserve power. In the sleep mode, the MS may power up components to monitor page messages in recurring MS Paging Listening ("listening") intervals, while powering down components in MS Paging Unavailable ("sleep") intervals.

Current versions of the WiMAX standards specify that the sleep mode may be deactivated when a MS starts a handover (HO) operation. HO operations may be used to transfer service provided to an MS from a serving BS to a target BS. To deactivate the sleep mode, the MS may employ a mobile station handover request (MOB_MSHO-REQ) or a handover indication (MOB_HO-IND) message, while the BS may utilize a base station handover request (MOB_BSHO-REQ) or the MOB_HO-IND message.

In some scenarios, attempts to perform HO operations may be hindered. For example, during the HO process, an MS may leave a region covered by the target BS or the signal provided from or to the BS may be obstructed. When the HO to a target BS is hindered, the MS may re-establish service with the serving BS.

SUMMARY

Certain embodiments of the present disclosure provide a method for wireless communications. The method generally includes determining that a handover (HO) to a target base station (BS) is cancelled, sending a message comprising a Power Saving Class Parameters type-length-value (TLV) to a serving BS, indicating the HO to the target BS is cancelled, and entering a sleep mode if the sleep mode is not rejected.

Certain embodiments of the present disclosure provide a method for wireless communications. The method generally includes receiving a message from a mobile station comprising a Power Saving Class Parameters type-length-value (TLV) indicating a handover to a target BS is cancelled and a previously exited sleep mode to be resumed, wherein the Power Saving Class Parameters TLV includes a first set of parameters used in the previously exited sleep mode, and determining if entering a sleep mode by the mobile station is acceptable.

Certain embodiments of the present disclosure provide an apparatus for wireless communications. The apparatus generally includes means for determining that a handover (HO) to a target base station (BS) is cancelled, means for sending a message comprising a Power Saving Class Parameters type-length-value (TLV) to a serving BS, indicating the HO to the target BS is cancelled, and means for entering a sleep mode if the sleep mode is not rejected.

Certain embodiments of the present disclosure provide an apparatus for wireless communications. The apparatus generally includes means for receiving a message from a mobile station comprising a Power Saving Class Parameters type-length-value (TLV) indicating a handover to a target BS is cancelled and a previously exited sleep mode to be resumed, wherein the Power Saving Class Parameters TLV includes a first set of parameters used in the previously exited sleep mode, and means for determining if entering a sleep mode by the mobile station is acceptable.

Certain embodiments of the present disclosure provide an apparatus for wireless communications. The apparatus generally includes logic for determining that a handover (HO) to a target base station (BS) is cancelled, logic for sending a message comprising a Power Saving Class Parameters type-length-value (TLV) to a serving BS, indicating the HO to the target BS is cancelled, and logic for entering a sleep mode if the sleep mode is not rejected.

Certain embodiments of the present disclosure provide an apparatus for wireless communications. The apparatus generally includes logic for receiving a message from a mobile station comprising a Power Saving Class Parameters type-length-value (TLV) indicating a handover to a target BS is cancelled and a previously exited sleep mode to be resumed, wherein the Power Saving Class Parameters TLV includes a first set of parameters used in the previously exited sleep mode, and logic for determining if entering a sleep mode by the mobile station is acceptable.

Certain embodiments of the present disclosure provide a computer-program storage apparatus for wireless communications, comprising a memory device having instructions stored thereon, the instructions being executable by one or more processors. The instructions generally include instructions for determining that a handover (HO) to a target base station (BS) is cancelled, instructions for sending a message comprising a Power Saving Class Parameters type-length-value (TLV) to a serving BS, indicating the HO to the target BS is cancelled, and instructions for entering a sleep mode if the sleep mode is not rejected.

Certain embodiments of the present disclosure provide a computer-program storage apparatus for wireless communications, comprising a memory device having instructions stored thereon, the instructions being executable by one or more processors. The instructions generally include instructions for receiving a message from a mobile station comprising a Power Saving Class Parameters type-length-value (TLV) indicating a handover to a target BS is cancelled and a previously exited sleep mode to be resumed, wherein the Power Saving Class Parameters TLV includes a first set of parameters used in the previously exited sleep mode, and instructions for determining if entering a sleep mode by the mobile station is acceptable.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
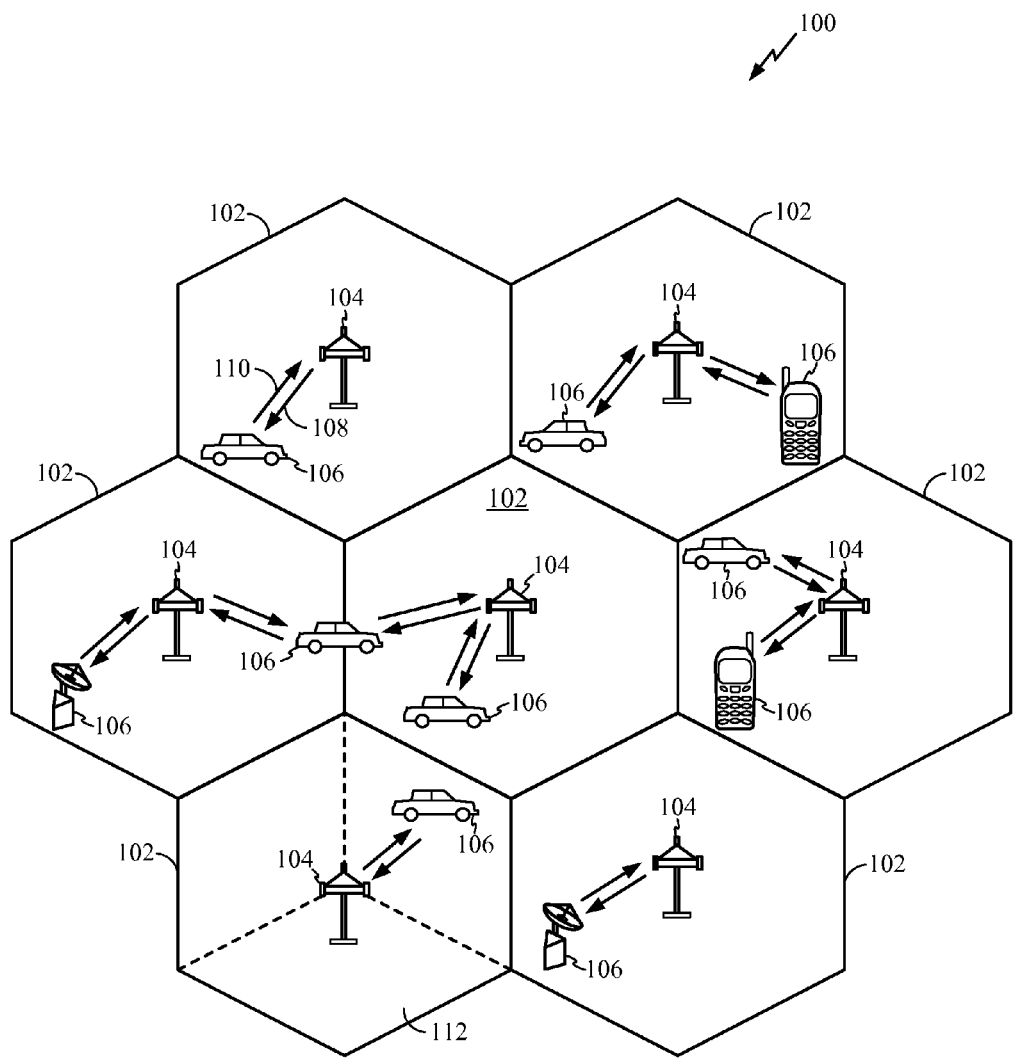
FIG. 1 illustrates an example wireless communication system, in accordance with certain embodiments of the present disclosure.

Certain embodiments are described herein with reference to the drawings, wherein like reference numerals are used to refer to like elements throughout. In the following description, for purposes of explanation, numerous specific details are set forth in order to provide a thorough understanding of certain embodiments. However, it may be that such embodiment(s) can be practiced without these specific details. In other instances, well-known structures and devices are shown in block diagram form in order to facilitate describing certain embodiments.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

The Institute of Electrical and Electronics Engineers (IEEE) 802.16x is an emerging standard organization to define an air interface for fixed and mobile broadband wireless access (BWA) systems. These two standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
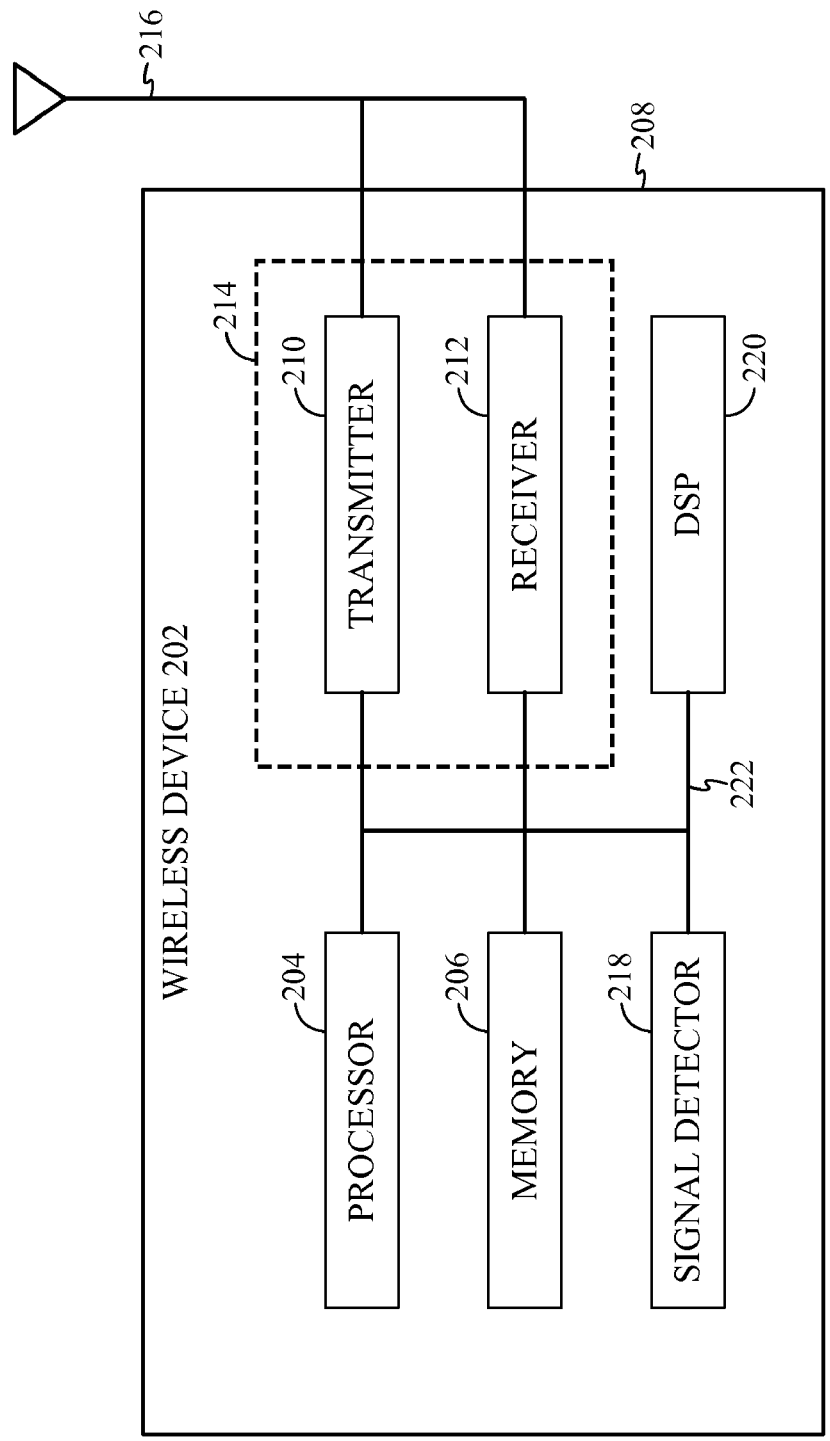
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
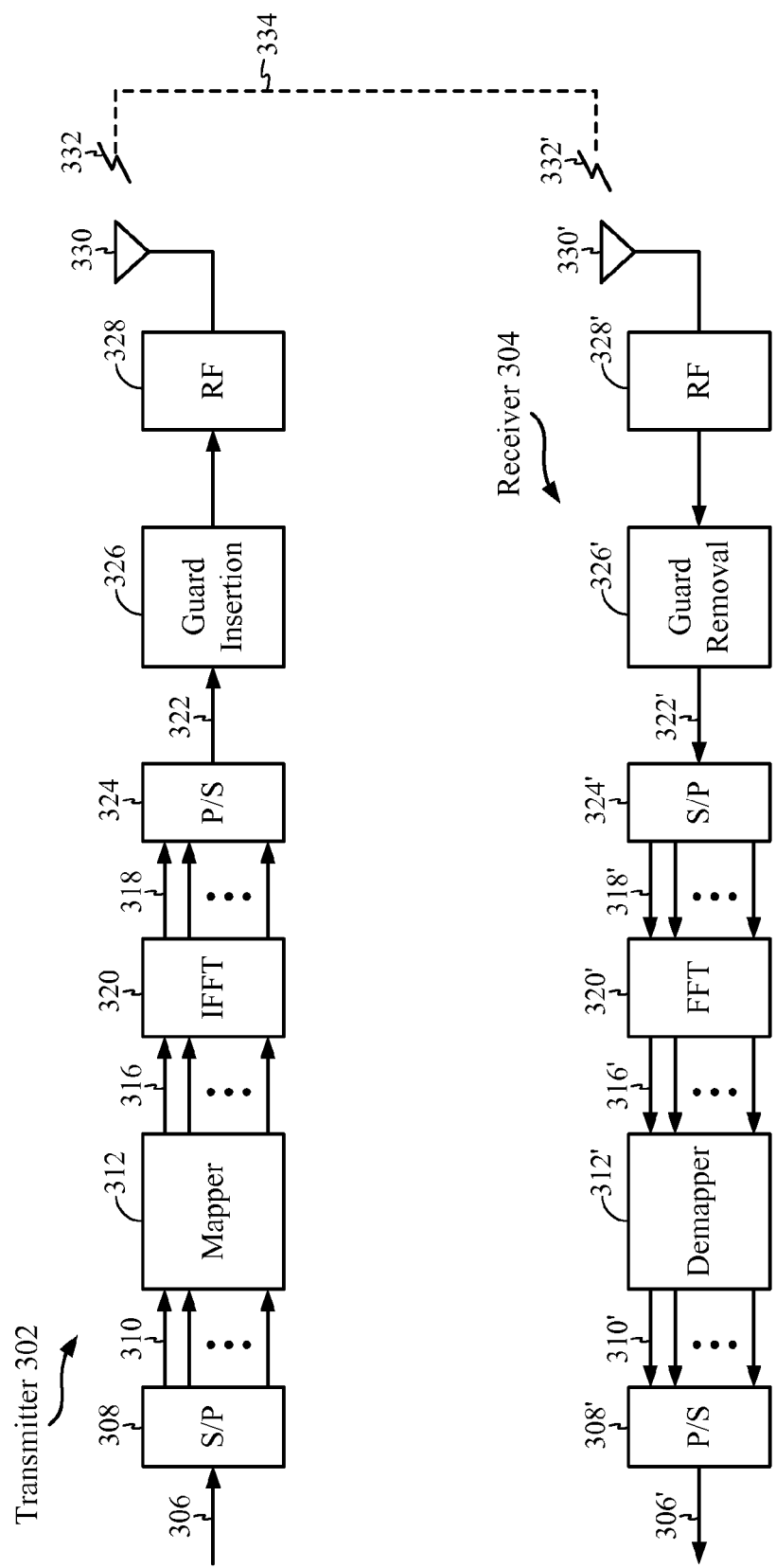
FIG. 3 illustrates an example transmitter and an example receiver that may be used within a wireless communication system that utilizes orthogonal frequency-division multiplexing and orthogonal frequency division multiple access (OFDM/OFDMA) technology per certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$, (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary MOB_HO-IND Message Enhancement

Certain embodiments of the present disclosure propose a method and apparatus through which reactivation of the sleep mode may be piggybacked in the handover cancelling message. For example, embodiments propose a new Power Saving Class Parameters type-length-value (TLV) to be added to the mobile station handover indication (MOB_HO-IND) message which may indicate reactivation of the sleep mode and provide a set of sleep mode parameters.

Sleep mode is one of the mobility features in the WiMAX family of standards. Current versions of the WiMAX standards specify that the sleep mode may be deactivated when a mobile station (MS) starts a handover (HO) operation from a serving base station (BS) to a target BS. To initiate a handover, the MS and the serving BS may exchange one or more of the following messages: a mobile station handover request (MOB_MSHO-REQ) message, a base station handover request (MOB_BSHO-REQ) message, and a MOB_-HO-IND message.

However, in certain situations, attempts to perform HO operations may be hindered and the HO may be cancelled. For example, during the HO process, an MS may leave a region covered by the target BS or the signal provided from or to the target BS may become obstructed.

Figure 4:
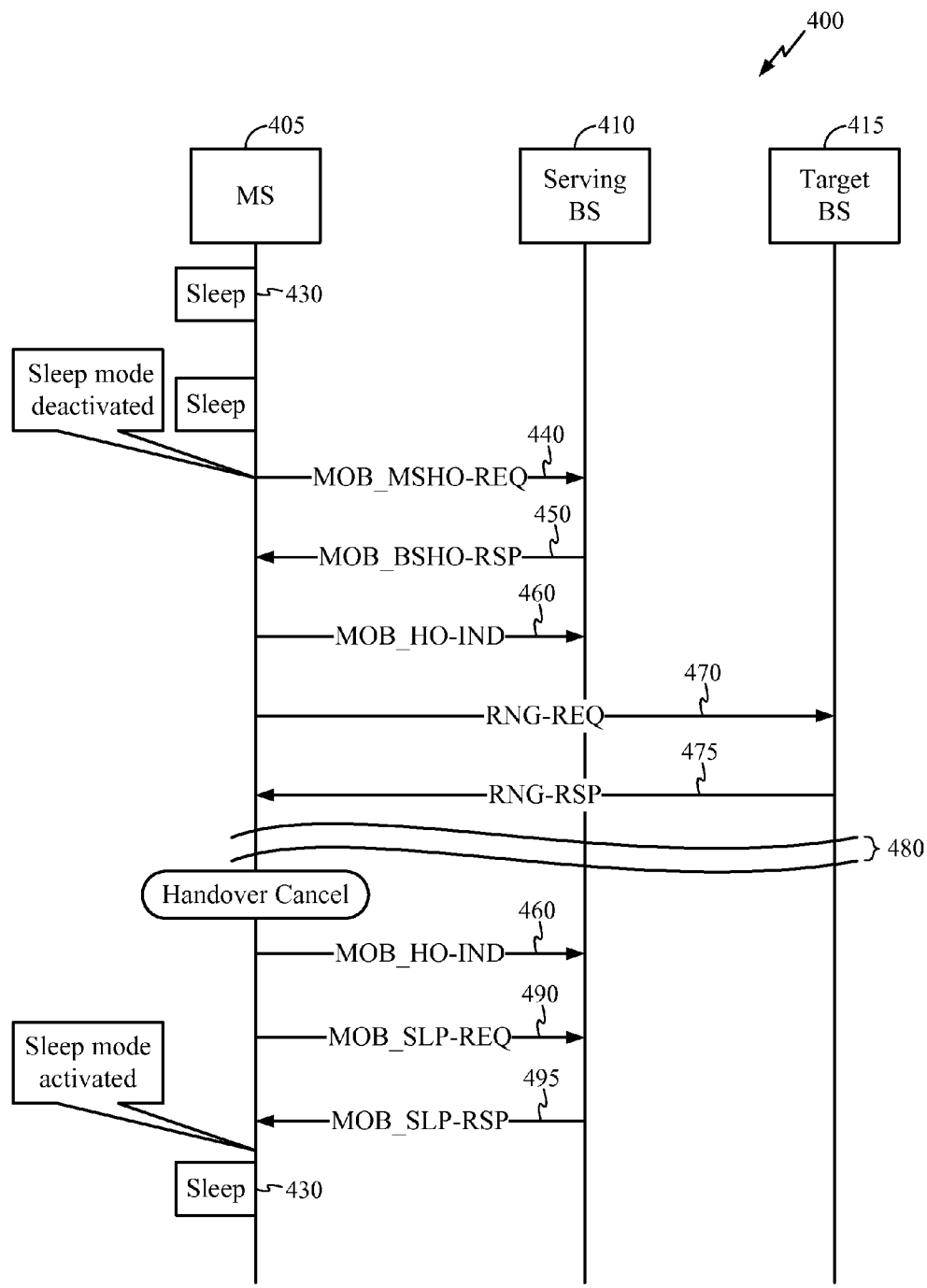
FIG. 4 illustrates an example exchange of messages between a mobile station and two base stations surrounding a cancelled handover.

FIG. 4 illustrates an example exchange of messages between a mobile station, a serving base station and a target base station surrounding a cancelled handover. As illustrated, the MS 405 may return to the serving BS 410 when HO operations with the target BS 415 are cancelled.

Before requesting a handover from the serving BS to the target BS, the MS may exit a sleep mode 430. The MS may initiate the handover by sending a MOB_MSHO_REQ 440 message to the serving BS. After receiving a mobile station handover response (MOB_BSHO-RSP) 450 message from the serving BS, the MS may send a MOB_HO-IND 460 message to the serving BS 410 for a final indication that it is about to perform an HO to the target BS 415.

The MS may then initiate the HO to the target BS, synchronizing with the downlink (DL) transmissions of the target BS and obtaining DL and uplink (UL) transmission parameters. The HO may begin with a ranging request (RNG-REQ) message 470 and a ranging response (RNG-RSP) message 475 followed by a series of subsequent HO operations 480. If the HO operations are hindered or the MS decides to cancel or reject the HO, the MS may send a MOB_HO-IND message 460 to the serving BS 410 with a handover indication type (HO_IND_type) value indicating the HO was cancelled. Consequently, the MS may resume previous operation with the serving BS, except the sleep mode.

Since the sleep mode was deactivated, re-establishing the sleep mode may be unnecessarily complex and time-consuming For example, the MS may need to exchange medium access control (MAC) management messages, such as mobile station sleep request (MOB_SLP-REQ) 490 and mobile station sleep response (MOB_SLP-RSP) 495 messages with the serving BS in order to resume sleep mode 430.

In an effort to simplify the procedure for resuming a sleep mode, embodiments of the present disclosure propose a method and apparatus through which reactivation of the sleep mode may be piggybacked in the handover cancelling message. For example, embodiments may include a new Power Saving Class (PSC) Parameters TLV (type-length-value) to be added to the MOB_HO-IND message 460.

Figure 5:
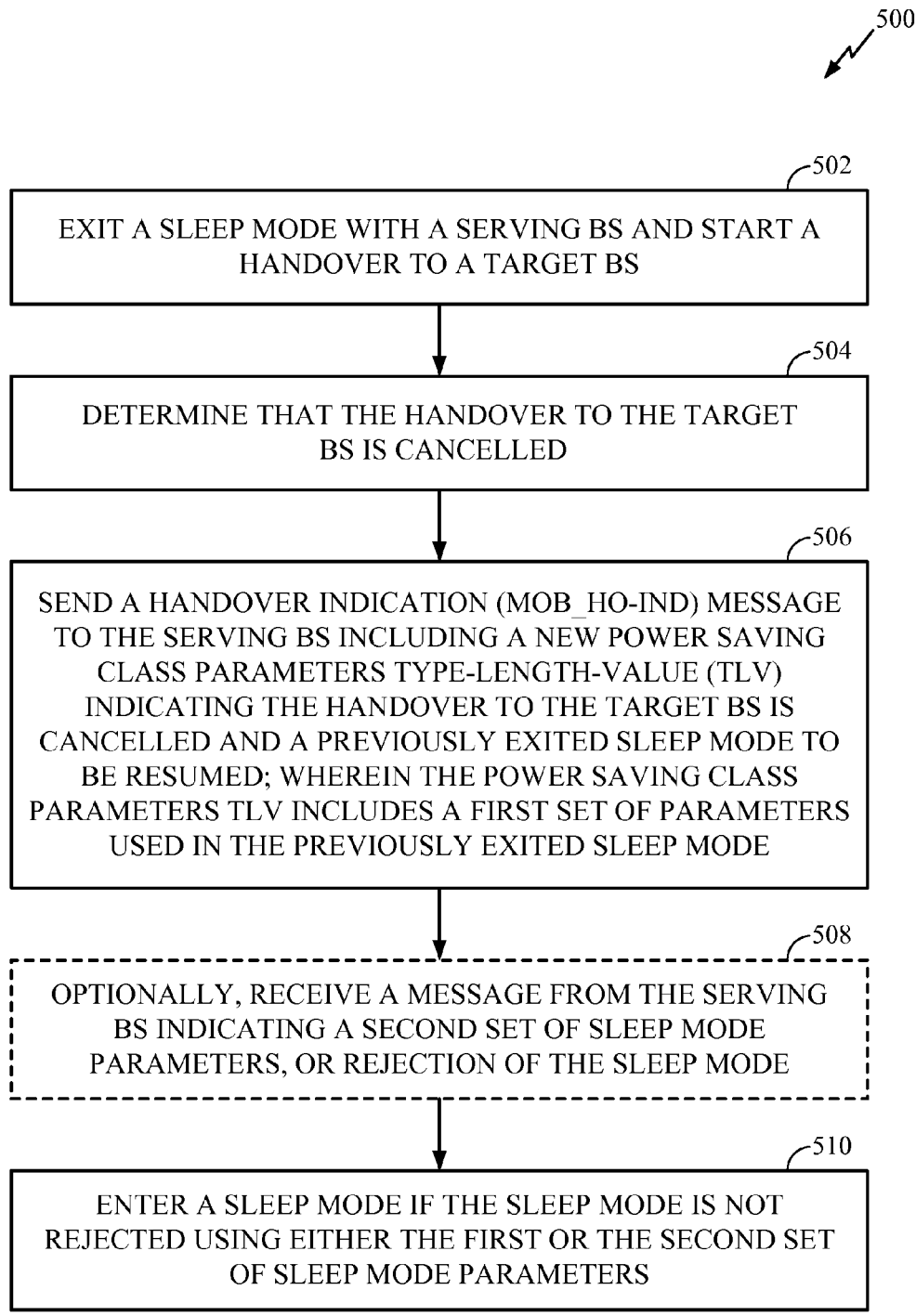
FIG. 5 illustrates example operations for an enhanced sleep mode reactivation process, that may be performed by a mobile station, following cancellation of handover operations, per certain embodiments of the present disclosure.

FIG. 5 illustrates example operations 500 for reactivating a sleep mode via a handover cancelling message, in accordance with certain embodiments of the present disclosure. The operations 500 may be performed, for example, by an MS in an effort to simplify the reactivation of a sleep mode subsequent to a cancelled HO.

At 502, the mobile station exits a sleep mode with a serving BS and starts handing over to a target BS. If the MS has previously received a mobile neighbor advertisement (MOB_NBR-ADV) message including target base station identification (BSID), Physical Frequency, downlink channel descriptor (DCD) and uplink channel descriptor (UCD) messages, this process may be shortened.

During the handover operations, the MS may decide to cancel or reject the handover. For example, the signal quality or signal strength from the target BS may change, making service from the target BS less desirable. Accordingly, at 504, the MS may determine that the handover to the target BS is cancelled.

At 506, the mobile station sends a MOB_HO-IND message to the serving BS including a new PSC Parameters type-length-value (TLV) indicating the handover to the target BS is cancelled and the previously exited sleep mode should be resumed. The PSC Parameters TLV may include a first set of parameters used in the previous sleep mode.

It should be noted that the PSC Parameters TLV is already defined in the WiMAX standards with respect to the ranging required (RNG-REQ) and ranging response (RNG-RSP) messages. For certain embodiments, the PSC Parameters TLV may also be used in the MOB_-HO-IND message when the HO_IND_type value indicates the handover was cancelled.

For certain embodiments, when the serving BS receives the MOB_-HO-IND message with the PSC Parameters TLV, it may restart the sleep mode with the MS if the included sleep mode parameters are still valid and acceptable. At 508, the mobile station may receive a message from the serving BS indicating a second set of sleep mode parameters, or rejection of the sleep mode. For example, the BS may have some pending data for the MS and reject the sleep mode. At 510, the mobile station enters a sleep mode if the sleep mode is not rejected using either the first or the second set of sleep mode parameters.

Figure 6:
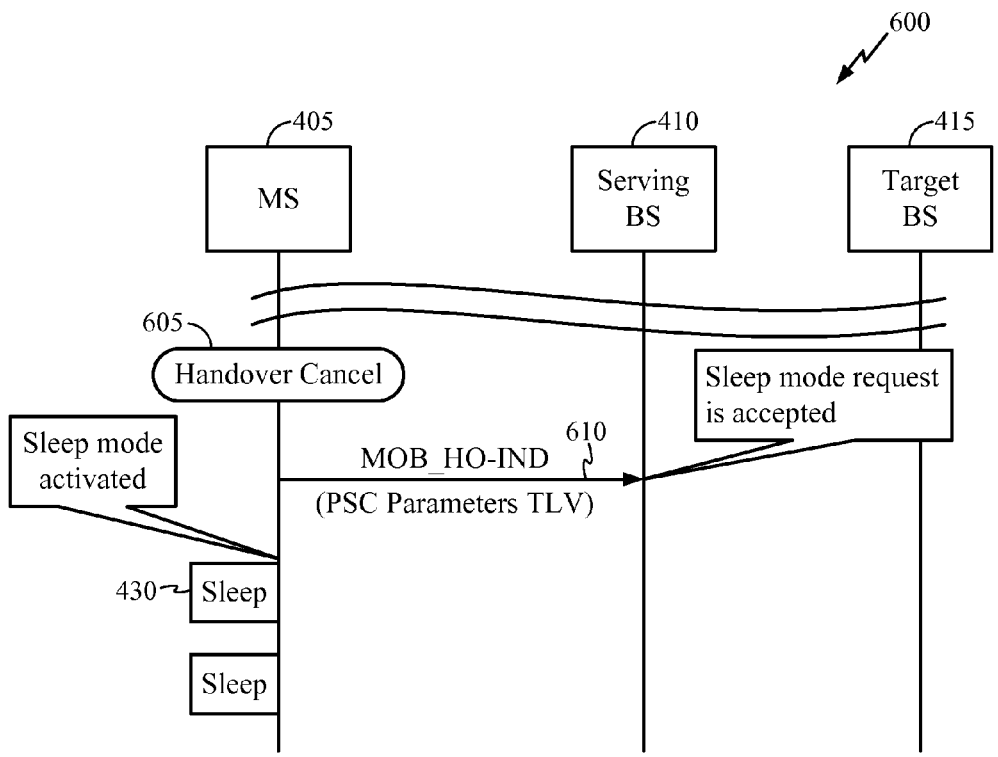
FIGS. 6 and 7 illustrate example exchange of messages between a mobile station and a serving base station for an enhanced sleep mode reactivation process after a cancelled handover operation, per certain embodiments of the present disclosure.

FIG. 6 illustrates an example exchange of messages between a mobile station and a serving base station for an enhanced sleep mode reactivation process after a cancelled handover operation, in accordance with certain embodiments of the present disclosure. As illustrated, the serving BS accepts the reactivation of the sleep mode with previously used sleep mode parameters.

Compared to FIG. 4, FIG. 6 illustrates a simplified sleep mode reactivation procedure without a need for the MOB-SLP-REQ 490 and MOB-SLP-RSP 495 message exchange. The MS 405, after deciding to cancel 605 the handover to a target BS, may send a MOB_-HO-IND 610 message including a PSC Parameters TLV to the serving BS. The mobile station may include a set of sleep mode parameters that was used in the previous sleep mode in the PSC Parameters TLV. After analyzing the sleep mode parameters, the serving BS may accept reactivation of the sleep mode by the MS.

Figure 7:
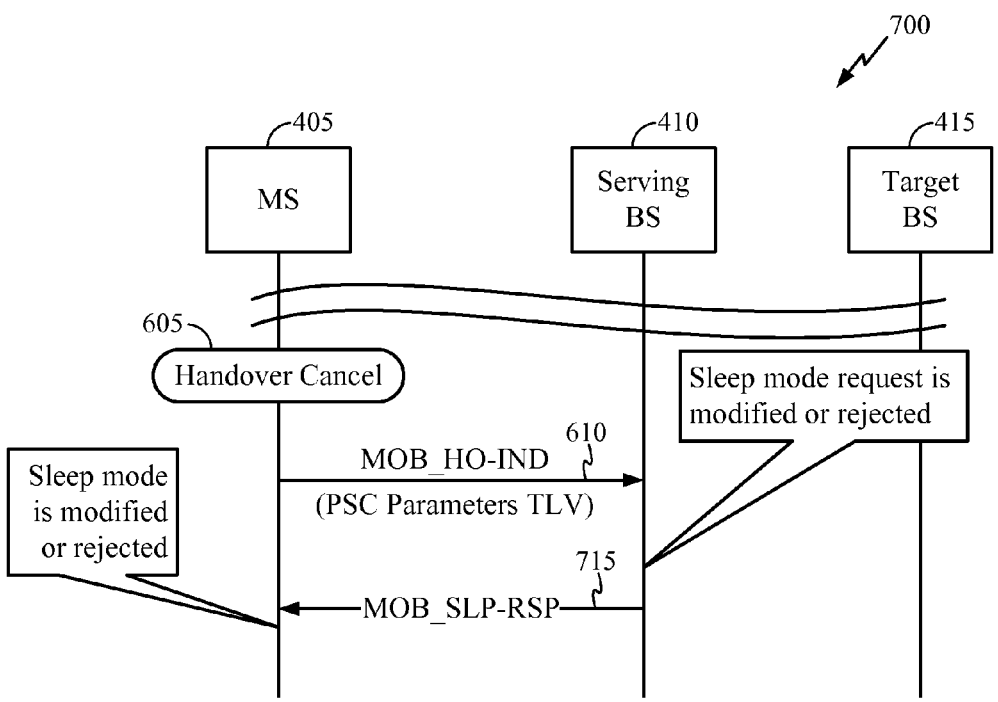

FIG. 7 illustrates an example exchange of messages between a mobile station and a serving base station for an enhanced sleep mode reactivation after a cancelled handover operation when the serving BS rejects sleep mode activation or modifies the sleep mode parameters included in the Power Saving Class Parameters TLV and sends a new set of sleep mode parameters to the MS, in accordance with certain embodiments of the present disclosure.

If the serving BS decides to reject reactivation of sleep mode, the BS sends the MOB_SLP-RSP message to the MS with Operation=Deactivation as defined in MOB_SLP-RSP message. If the serving BS accepts reactivation of the sleep mode but decides to modify the sleep mode parameters, the serving BS may send a MOB_SLP-RSP message to the MS to revise the sleep mode parameters.

Figure 8:
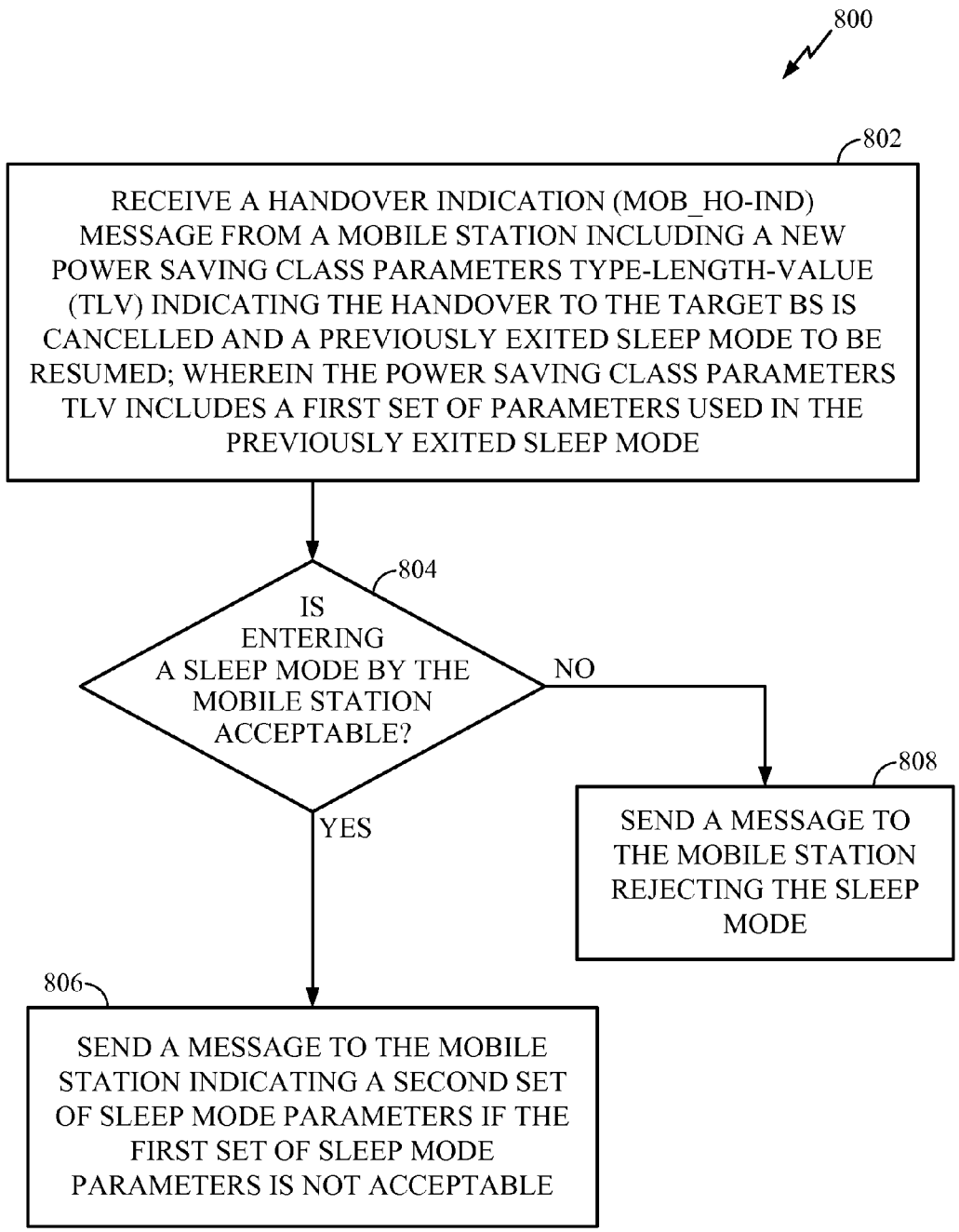
FIG. 8 illustrates example operations for an enhanced sleep mode reactivation process, that may be performed by a base station, following cancellation of handover operations, in accordance with certain embodiments of the present disclosure.

FIG. 8 illustrates example operations 800 for an enhanced sleep mode reactivation process, in accordance with certain embodiments of the present disclosure. The operations 800 may be performed, for example, by a serving BS in an effort to simplify the reactivation of a sleep mode subsequent to a cancelled HO.

At 802, the serving BS receives a handover indication (MOB_-HO-IND) message from a mobile station including a new PSC Parameters TLV indicating the handover to the target BS is cancelled and the previously exited sleep mode should be resumed. The PSC Parameters TLV may include a first set of parameters used in the previous sleep mode. At 804, the serving BS checks to see if entering a sleep mode by the mobile station is acceptable or not. If entering a sleep mode is acceptable and the parameters sent by the MS are also acceptable, the MS may enter a sleep mode using the first set of sleep mode parameters.

On the other hand, at 806, the serving BS may send a message to the mobile station indicating a second set of sleep mode parameters if entering sleep mode is acceptable but the first set of sleep mode parameters are not acceptable. Therefore, the serving BS may send a MOB_SLP-RSP message modifying the set of sleep mode parameters.

At 808, the serving BS may send a message to the mobile station rejecting the sleep mode, if entering sleep mode by the mobile station is not acceptable. For certain embodiments, the BS may decide to reject a sleep mode reactivation, e.g., if the serving BS has pending downlink traffic destined to the MS. If the serving BS decides to reject the sleep mode reactivation, it may send the MOB_SLP-RSP message 715 with an operation field value indicating deactivation of the sleep mode.

As mentioned above, certain embodiments of the present disclosure proposed methods for reactivation of the sleep mode after cancellation of a handover process. The proposed method simplifies the message exchange between an MS and a serving BS during the reactivation process.

Figure 5A:
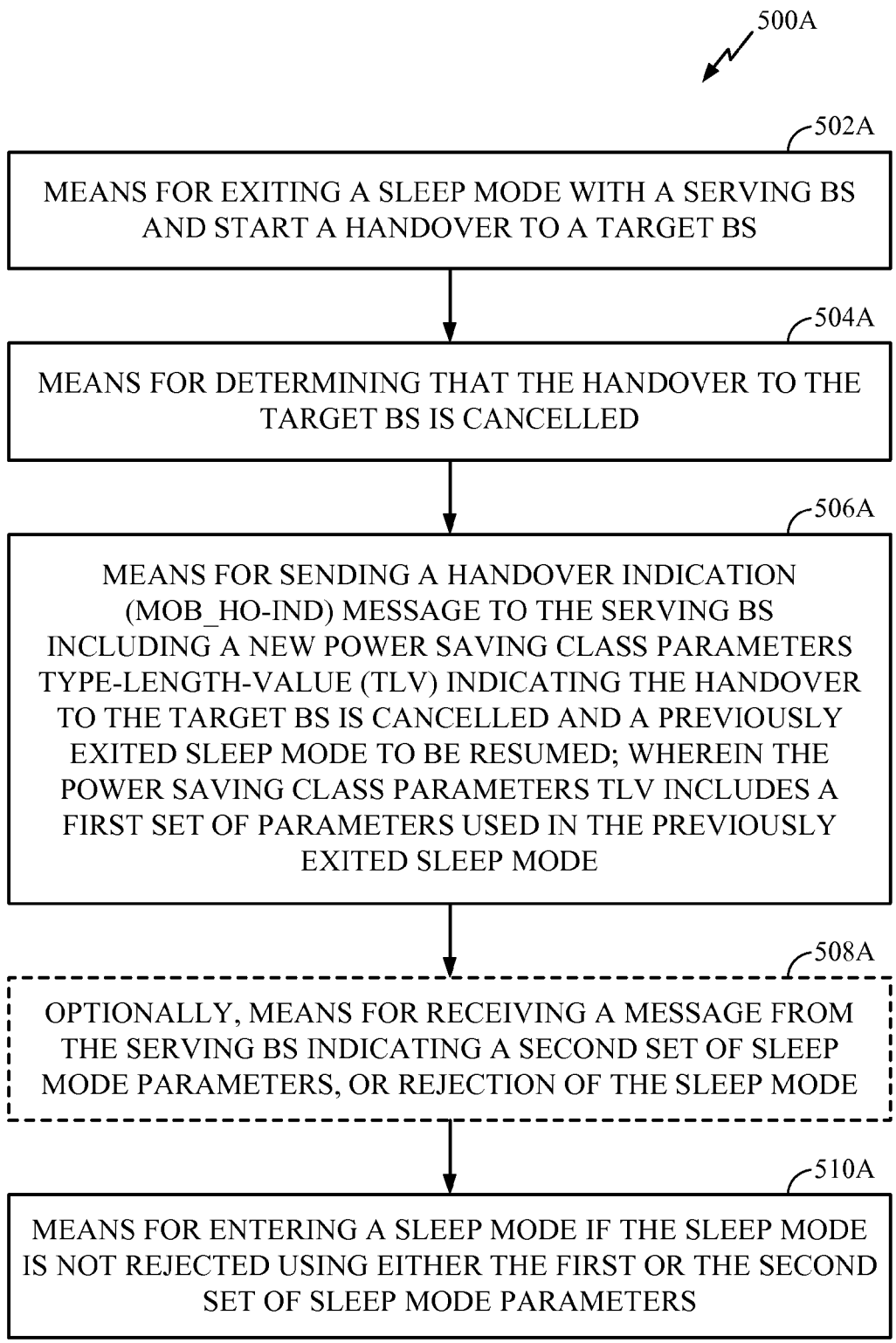
FIG. 5A is a block diagram of means corresponding to the example operations illustrated in FIG. 5.
Figure 8A:
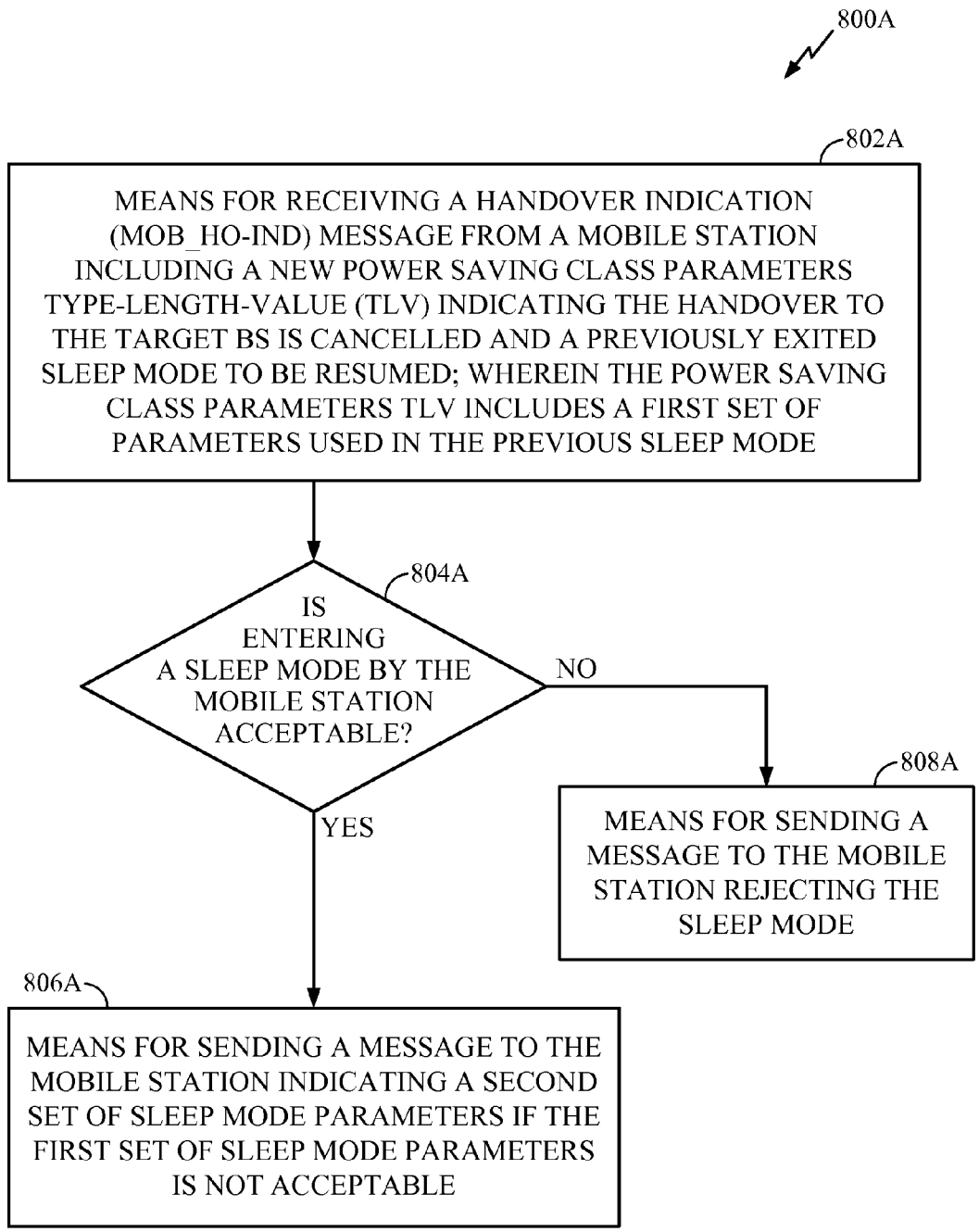
FIG. 8A is a block diagram of means corresponding to the example operations illustrated in FIG. 8.

The various operations of methods described above may be performed by various hardware and/or software component(s) and/or module(s) corresponding to the illustrated means-plus-function blocks. Generally, where there are methods illustrated in Figures having corresponding counterpart means-plus-function Figures, the operation blocks correspond to means-plus-function blocks with similar numbering. For example, blocks 502-510 illustrated in FIG. 5 correspond to means-plus-function blocks 502A-510A illustrated in FIG. 5A, while blocks 802-808 illustrated in FIG. 8 correspond to means-plus-function blocks 802A-808A illustrated in FIG. 8A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits, or simply, logic, described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, or in a software module executed by a processor or in a combination of the two. A software module may reside in any form of storage medium or memory device that is known in the art. Some examples of storage media that may be used include RAM memory, flash memory, ROM memory, EPROM memory, EEPROM memory, registers, a hard disk, a removable disk, a CD-ROM, or any optical, magnetic, organic or quantum storage device, and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in software, the functions may be stored as one or more instructions on a computer-readable medium, or storage device. A storage media or device may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims. While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
determining that a handover (HO) to a target base station (BS) is cancelled;
sending a message comprising a Power Saving Class Parameters type-length-value (TLV) to a serving BS, indicating the HO to the target BS is cancelled; and
entering a sleep mode if the sleep mode is not rejected.

2. The method of claim 1, wherein the power saving class parameters TLV comprises a first set of sleep mode parameters used in a previously exited sleep mode, and entering the sleep mode comprises:
entering the sleep mode utilizing the first set of sleep mode parameters.

3. The method of claim 1, further comprising:
receiving a message from the serving BS indicating a second set of sleep mode parameters; and
entering the sleep mode utilizing the second set of sleep mode parameters.

4. The method of claim 1, further comprising:
receiving a message from the serving BS indicating rejection of the sleep mode.

5. The method of claim 1, further comprising:
exiting the sleep mode with the serving BS and negotiating the HO to the target BS.

6. The method of claim 1, wherein the message comprises a request for reactivation of a previously exited sleep mode.

7. The method of claim 1, wherein the message comprises a Mobile Station Handover Indication (MOB_HO-IND) message, and the Power Saving Class Parameters TLV is defined with respect to a ranging request (RNG-REQ) message by the Institute of Electrical and Electronics Engineers (IEEE) 802.16 standard.

8. A method for wireless communications, comprising:
receiving a message from a mobile station comprising a Power Saving Class Parameters type-length-value (TLV) indicating a handover to a target BS is cancelled and a previously exited sleep mode to be resumed; wherein the Power Saving Class Parameters TLV includes a first set of parameters used in the previously exited sleep mode; and
determining if entering a sleep mode by the mobile station is acceptable.

9. The method of claim 8, further comprising:
determining whether or not the first set of sleep mode parameters is acceptable.

10. The method of claim 9, further comprising:
sending a message to the mobile station indicating a second set of sleep mode parameters if the first set of sleep mode parameters is not acceptable.

11. The method of claim 8, further comprising:
sending a message to the mobile station rejecting the sleep mode if entering the sleep mode is not acceptable.

12. The method of claim 8, wherein the message comprises a Mobile Station Handover Indication (MOB_HO-IND) message, and the Power Saving Class Parameters TLV is defined with respect to a ranging request (RNG-REQ) message by the Institute of Electrical and Electronics Engineers (IEEE) 802.16 standard.

13. An apparatus for wireless communications, comprising:
means for determining that a handover (HO) to a target base station (BS) is cancelled;
means for sending a message comprising a Power Saving Class Parameters type-length-value (TLV) to a serving BS, indicating the HO to the target BS is cancelled; and
means for entering a sleep mode if the sleep mode is not rejected.

14. The apparatus of claim 13, wherein the power saving class parameters TLV comprises a first set of sleep mode parameters used in a previously exited sleep mode, and the means for entering the sleep mode comprises:
means for entering the sleep mode utilizing the first set of sleep mode parameters.

15. The apparatus of claim 13, further comprising:
means for receiving a message from the serving BS indicating a second set of sleep mode parameters; and
means for entering the sleep mode utilizing the second set of sleep mode parameters.

16. The apparatus of claim 13, further comprising:
means for receiving a message from the serving BS indicating rejection of the sleep mode.

17. The apparatus of claim 13, further comprising:
means for exiting the sleep mode with the serving BS and negotiating the HO to the target BS.

18. The apparatus of claim 13, wherein the message comprises a request for reactivation of a previously exited sleep mode.

19. The apparatus of claim 13, wherein the message comprises a Mobile Station Handover Indication (MOB_HO-IND) message, and the Power Saving Class Parameters TLV is defined with respect to a ranging request (RNG-REQ) message by the Institute of Electrical and Electronics Engineers (IEEE) 802.16 standard.

20. An apparatus for wireless communications, comprising:
means for receiving a message from a mobile station comprising a Power Saving Class Parameters type-length-value (TLV) indicating a handover to a target BS is cancelled and a previously exited sleep mode to be resumed; wherein the Power Saving Class Parameters TLV includes a first set of parameters used in the previously exited sleep mode; and
means for determining if entering a sleep mode by the mobile station is acceptable.

21. The apparatus of claim 20, further comprising:
means for determining whether or not the first set of sleep mode parameters is acceptable.

22. The apparatus of claim 21, further comprising:
means for sending a message to the mobile station indicating a second set of sleep mode parameters if the first set of sleep mode parameters is not acceptable.

23. The apparatus of claim 20, further comprising:
means for sending a message to the mobile station rejecting the sleep mode if entering the sleep mode is not acceptable.

24. The apparatus of claim 20, wherein the message comprises a Mobile Station Handover Indication (MOB_HO-IND) message, and the Power Saving Class Parameters TLV is defined with respect to a ranging request (RNG-REQ) message by the Institute of Electrical and Electronics Engineers (IEEE) 802.16 standard.

25. An apparatus for wireless communications, comprising:
  logic for determining that a handover (HO) to a target base station (BS) is cancelled;
  logic for sending a message comprising a Power Saving Class Parameters type-length-value (TLV) to a serving BS, indicating the HO to the target BS is cancelled; and
  logic for entering a sleep mode if the sleep mode is not rejected.

26. The apparatus of claim 25, wherein the power saving class parameters TLV comprises a first set of sleep mode parameters used in a previously exited sleep mode, and the logic for entering the sleep mode comprises:
  logic for entering the sleep mode utilizing the first set of sleep mode parameters.

27. The apparatus of claim 25, further comprising:
  logic for receiving a message from the serving BS indicating a second set of sleep mode parameters; and
  logic for entering the sleep mode utilizing the second set of sleep mode parameters.

28. The apparatus of claim 25, further comprising:
  logic for receiving a message from the serving BS indicating rejection of the sleep mode.

29. The apparatus of claim 25, further comprising:
  logic for exiting the sleep mode with the serving BS and negotiating the HO to the target BS.

30. The apparatus of claim 25, wherein the message comprises a request for reactivation of a previously exited sleep mode.

31. The apparatus of claim 25, wherein the message comprises a Mobile Station Handover Indication (MOB_HO-IND) message, and the Power Saving Class Parameters TLV is defined with respect to a ranging request (RNG-REQ) message by the Institute of Electrical and Electronics Engineers (IEEE) 802.16 standard.

32. An apparatus for wireless communications, comprising:
  logic for receiving a message from a mobile station comprising a Power Saving Class Parameters type-length-value (TLV) indicating a handover to a target BS is cancelled and a previously exited sleep mode to be resumed; wherein the Power Saving Class Parameters TLV includes a first set of parameters used in the previously exited sleep mode; and
  logic for determining if entering a sleep mode by the mobile station is acceptable.

33. The apparatus of claim 32, further comprising:
  logic for determining whether or not the first set of sleep mode parameters is acceptable.

34. The apparatus of claim 33, further comprising:
  logic for sending a message to the mobile station indicating a second set of sleep mode parameters if the first set of sleep mode parameters is not acceptable.

35. The apparatus of claim 32, further comprising:
  logic for sending a message to the mobile station rejecting the sleep mode if entering the sleep mode is not acceptable.

36. The apparatus of claim 32, wherein the message comprises a Mobile Station Handover Indication (MOB_HO-IND) message, and the Power Saving Class Parameters TLV is defined with respect to a ranging request (RNG-REQ) message by the Institute of Electrical and Electronics Engineers (IEEE) 802.16 standard.

37. A computer-program storage apparatus for wireless communications, comprising a memory device having instructions stored thereon, the instructions being executable by one or more processors and the instructions comprising:
  instructions for determining that a handover (HO) to a target base station (BS) is cancelled;
  instructions for sending a message comprising a Power Saving Class Parameters type-length-value (TLV) to a serving BS, indicating the HO to the target BS is cancelled; and
  instructions for entering a sleep mode if the sleep mode is not rejected.

38. The computer-program storage apparatus of claim 37, wherein the power saving class parameters TLV comprises a first set of sleep mode parameters used in a previously exited sleep mode, and the instructions for entering the sleep mode comprises:
  instructions for entering the sleep mode utilizing the first set of sleep mode parameters.

39. The computer-program storage apparatus of claim 37, further comprising:
  instructions for receiving a message from the serving BS indicating a second set of sleep mode parameters; and
  instructions for entering the sleep mode utilizing the second set of sleep mode parameters.

40. The computer-program storage apparatus of claim 37, further comprising:
  instructions for receiving a message from the serving BS indicating rejection of the sleep mode.

41. The computer-program storage apparatus of claim 37, further comprising:
  instructions for exiting the sleep mode with the serving BS and negotiating the HO to the target BS.

42. The computer-program storage apparatus of claim 37, wherein the message comprises a request for reactivation of a previously exited sleep mode.

43. The computer-program storage apparatus of claim 37, wherein the message comprises a Mobile Station Handover Indication (MOB_HO-IND) message, and the Power Saving Class Parameters TLV is defined with respect to a ranging request (RNG-REQ) message by the Institute of Electrical and Electronics Engineers (IEEE) 802.16 standard.

44. A computer-program storage apparatus for wireless communications, comprising a memory device having instructions stored thereon, the instructions being executable by one or more processors and the instructions comprising:
  instructions for receiving a message from a mobile station comprising a Power Saving Class Parameters type-length-value (TLV) indicating a handover to a target BS is cancelled and a previously exited sleep mode to be resumed; wherein the Power Saving Class Parameters TLV includes a first set of parameters used in the previously exited sleep mode; and
  instructions for determining if entering a sleep mode by the mobile station is acceptable.

45. The computer-program storage apparatus of claim 44, further comprising:
  instructions for determining whether or not the first set of sleep mode parameters is acceptable.

46. The computer-program storage apparatus of claim 45, further comprising:
  instructions for sending a message to the mobile station indicating a second set of sleep mode parameters if the first set of sleep mode parameters is not acceptable.

47. The computer-program storage apparatus of claim 44, further comprising:
  instructions for sending a message to the mobile station rejecting the sleep mode if entering the sleep mode is not acceptable.

48. The computer-program storage apparatus of claim 44, wherein the message comprises a Mobile Station Handover Indication (MOB_HO-IND) message, and the Power Saving Class Parameters TLV is defined with respect to a ranging request (RNG-REQ) message by the Institute of Electrical and Electronics Engineers (IEEE) 802.16 standard.

* * * * *